United States Patent Office 3,424,402
Patented Jan. 28, 1969

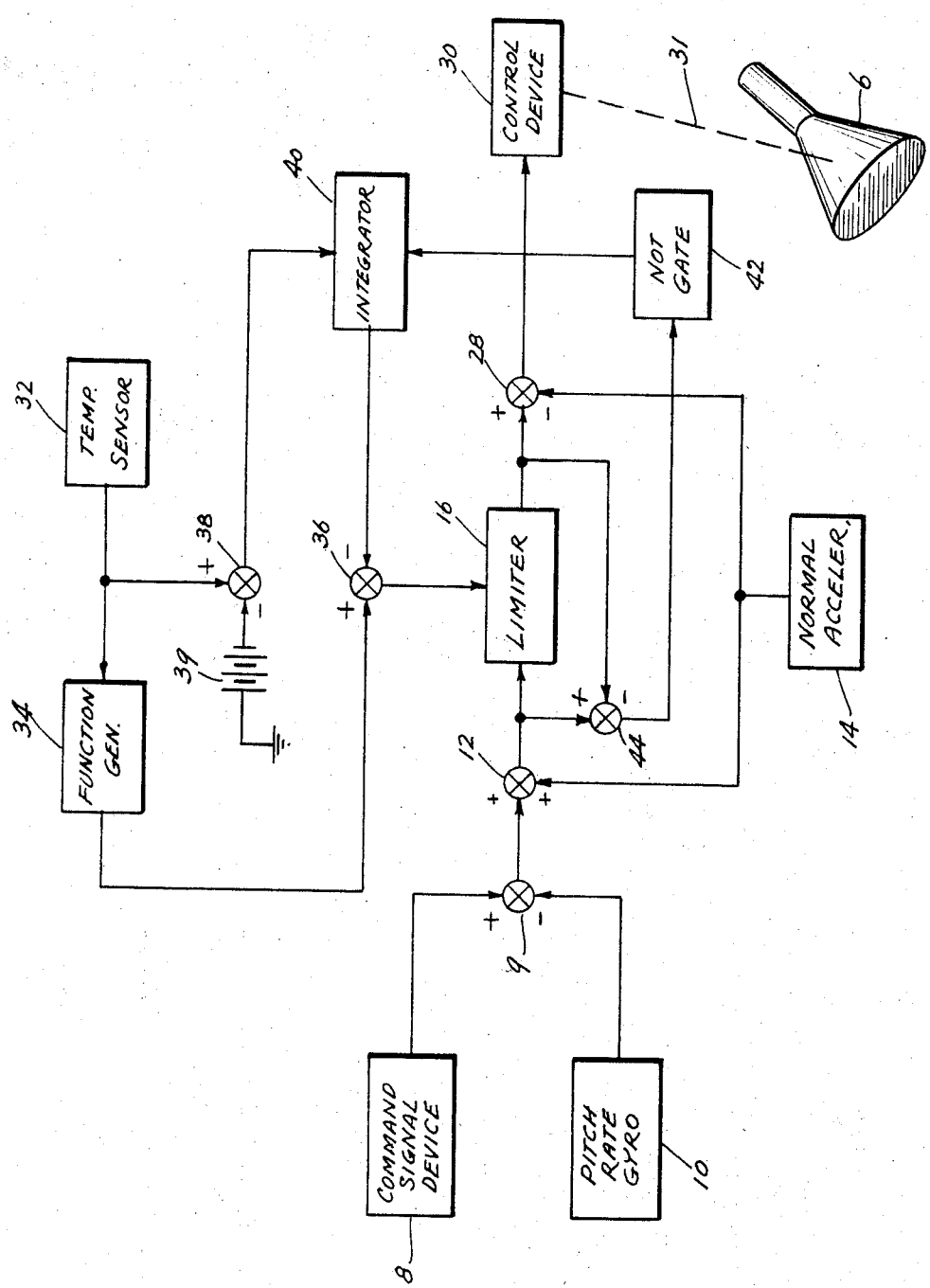

3,424,402
FLIGHT CONTROL SYSTEM FOR A SPACE VEHICLE
James E. Bulloch, Macon, Ga., and Walter A. Platt, Fairlawn, N.J., assignors to The Bendix Corporation, a corporation of Delaware
Filed Nov. 23, 1966, Ser. No. 600,687
U.S. Cl. 244—1
Int. Cl. B64g 1/00; B64c 13/50; H02p 1/04
9 Claims

ABSTRACT OF THE DISCLOSURE

A system for controlling a space vehicle during re-entry into the earth's atmosphere including means for maintaining structural loading of the vehicle below a safe limit.

Background of the invention

A space vehicle during re-entry must be controlled with due regard for several considerations. Of significant importance among these considerations is glide range which is determined by the re-entry trajectory. Of paramount importance is normal acceleration, a measure of structural loading, which must be maintained below a safe limit commensurate with the structural characteristics of the vehicle.

During early re-entry (high speed-altitude flight) excessive heating lessens the structural strength of the vehicle and normal acceleration must be limited as a function of structural temperature. During later re-entry, the limit must be in accordance with the design load factor of the vehicle. The limit of normal acceleration determines the maneuverability of the vehicle in correcting deviations from a predetermined re-entry trajectory. This, in turn, affects the glide range.

Heretofore, structural loading, as measured by normal acceleration, was limited as a function of structural temperature to insure an adequate margin of safety. However, this restricted maneuverability in correcting deviations from the trajectory and, in many instances caused the vehicle to miss the target.

Maneuverability may be improved by adjusting the safe limit of structural loading as a function of sensed structural temperature. However, temperature sensor lag requires a safety margin with an associated loss in maneuverability. To further improve maneuverability, the present invention maintains structural loading below a safe limit as a function of instantaneous structural temperature. With this arrangement only a small safety margin is required because the vehicle is controlled in accordance with instantaneous structural loading.

Another consideration, apart from safety and target accuracy, is desired dynamic response. Heretofore, since structural loading was measured by normal acceleration and was maintained below a safe limit, control system response depended primarily on normal acceleration, which restricted design flexibility. The response of the novel system of the present invention depends on normal acceleration only when the vehicle is operating at the safe limit and provides for maximum design flexibility.

One object of this invention is to improve the maneuverability of a space vehicle to an extent heretofore not possible while maintaining structural loading below a safe limit.

Another object of this invention is to limit structural loading as a function of instantaneous structural temperature.

Another object of this invention is to permit maximum normal acceleration when structural loading is below a safe limit to improve vehicle maneuverability.

Another object of this invention is to impose a safe limit on vehicle maneuverability only when it is absolutely necessary to preserve structural stability by lowering the safety margin heretofore required, but without endangering the vehicle.

Another object of this invention is to limit structural loading in accordance with the structural strength of the vehicle and to adjust the limit in response to instantaneous structural temperature when excessive heating lessens the structural strength.

Another object of this invention is to permit maximum control system design flexibility when structural loading is below a safe limit.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

Description of the invention

This invention contemplates a system for controlling a space vehicle in accordance with the structural loading of the vehicle during re-entry into the earth's atmosphere. A control signal is provided by adding an error signal and a signal corresponding to the structural loading of the vehicle. A limiter responsive to instantaneous structural temperature limits the amplitude of the control signal to maintain structural loading of the vehicle below a safe limit. The structural loading signal is subtracted from the limited signal and a control device is responsive to the difference signal for controlling the vehicle.

With this arrangement, when the amplitude of the control signal is below the limit, the space vehicle responds to the error signal and is fully maneuverable. However, only when the amplitude of the control signal is greater than the limit is the maneuverability of the vehicle decreased. Since the limit varies with instantaneous temperature, the limit is higher than heretofore, even though the same instantaneous margin of safety is maintained.

The single figure in the drawing shows a schematic diagram of a novel flight control system for a space vehicle constructed according to the invention.

A system for controlling a space vehicle constructed according to the present invention includes a command signal device 8 for providing a pitch command signal. Command signal device 8 may be any suitable means for guiding a space vehicle 6, such as a device manually operated by the pilot. A pitch rate gyro 10 provides a signal corresponding to the pitch rate of vehicle 6. A summation means 9 connected to command signal device 8 and connected to pitch rate gyro 10 sums the signals therefrom and provides an error signal in accordance with the summation.

A normal accelerometer 14 provides a signal corresponding to the normal acceleration of vehicle 6 about the pitch axis and which is a measure of the structural loading of vehicle 6. A summation means 12 connected to summation means 9 and connected to normal accelerometer 14 adds the signals therefrom, relating the error signal to structural loading, and provides a control signal. A limiter 16 connected to summation means 12 limits the maximum amplitude of the control signal to a value consistent with the design load factor of vehicle 6 and a summation means 28 connected to limiter 16 and connected to normal accelerometer 14 subtracts the normal acceleration signal from the limited signal. The difference signal from summation means 28 is applied to a control device 30 which is connected by suitable mechanical means 31 to a pitch control element (not shown) of vehicle 6 for controlling the pitch attitude of the vehicle. When the control signal is less than the limit, vehicle 6 is fully maneuverabe and is controlled independently of normal acceleration since the normal acceleration signal added to the limiter input is cancelled by the same normal acceleration signal substracted from the limiter output. System response then depends primarily on the dynamic characteristics of vehicle 6 and the characteristics of command signal device 8 and pitch rate gyro 10.

When the control signal is limited, the output of limiter 16 is in effect a normal acceleration command to a closed loop control system and system response changes in accordance with the characteristics of normal accelerometer 14.

During early re-entry heating lessens the structural strength of vehicle 6 and structural loading as measured by normal acceleration must be limited to a safe value as a function of structural temperature. A temperature sensor 32 provides a signal corresponding to the structural temperature of vehicle 6 which is shaped by a function generator 34 and applied through a summation means 36 to limiter 16 for adjusting the limiter in accordance with a preprogrammed structural loading-structural temperature relationship.

A battery 39 provides a fixed voltage corresponding to a predetermined critical structural temperature plus a safety margin. A summation means 38 connected to temperature sensor 32 and to a battery 39 algebraically sums the structural temperature signal and the fixed voltage. An integrator 40 integrates the summation signal and slowly applies the integrated signal to summation means 36 to correct the signal from function generator 34 for temperature sensor lag so that limiter 16 is adjusted as a function of instantaneous structural temperature.

Integrator 40 is reset when the amplitude of the control signal is greater than the limit of limiter 16. The control signal at the input of limiter 16 then is greater than the limited control signal at the output of the limiter. A summation means 44 connected to the input and to the output of limiter 16 algebraically sums the control signal and the limited control signal and provides a signal which controls a NOT gate 42. When the control signal is greater than the limited control signal, summation means 44 provides a signal to gate 42 to reset integrator 40 to zero to prevent integrator memory errors.

*Operation*

The normal acceleration signal from normal accelerometer 14 is added to the error signal from summation means 9 providing a control signal related to structural loading which is maintained below a limit by limiter 16 in accordance with the design load factor of vehicle 6. The normal acceleration signal is subtracted from the limited control signal and the vehicle is controlled in response to the difference therebetween. During early re-entry the limit is adjusted as a function of instantaneous structural temperature in accordance with a preprogrammed structural loading-structural temperature relationship.

The flight control system of the present invention permits maximum normal acceleration while maintaining structural loading below a safe limit so that trajectory correction maneuvers are performed with safety of flight assurance. Since the safe limit of structural loading is in accordance with the instantaneous structural characteristics of vehicle 6, maneuverability, and hence target accuracy, is improved to an extent heretofore not possible.

The system, although operating as an acceleration limiter permits control of the vehicle independent of normal acceleration when no limiting occurs. The significance of this feature will be understood when it is considered that in many instances a design objective is to provide a control system having a desired dynamic response. The present invention sacrifices this objective only when safety of flight assurance is an overriding consideration, and thus permits design flexibility.

What is claimed is:
1. A system for controlling a space vehicle in accordance with the structural loading of the vehicle during reentry into the earth's atmosphere, comprising:
   means for providing a control signal including means for providing a signal corresponding to structural loading;
   a limiter connected to the control signal means for limiting the control signal to maintain structural loading of the vehicle below a safe limit commensurate with the design load factor of the vehicle;
   means connected to the limiter for adjusting the safe limit of structural loading in accordance with instantaneous structural temperature; and
   control means connected to the limiter and connected to the structural loading signal means and responsive to the signals therefrom for controlling the vehicle.

2. A system as described by claim 1 wherein the means connected to the limiter for adjusting the safe limit of structural loading in accordance with instantaneous structural temperature, comprises:
   a temperature sensor for providing a signal corresponding to the structural temperature of the vehicle;
   a function generator connected to the temperature sensor for shaping the signal therefrom as a function of structural loading in accordance with a preprogrammed structural loading-structural temperature relationship;
   means for providing a signal to compensate for temperature sensor lag; and
   means connected to the function generator and connected to the last mentioned means for summing the signals therefrom and for providing a signal for adjusting the limiter in accordance with the summation.

3. A system as described by claim 2 wherein the means for providing a signal to compensate for temperature sensor lag includes:
   means for providing a signal corresponding to a predetermined critical structural temperature;
   means connected to the temperature sensor and connected to the critical structural temperature signal means for summing the signals therefrom; and
   an integrator connected to the last mentioned means for integrating the summation signal and for providing the signal to compensate for temperature sensor lag in accordance with the integration.

4. A system as described by claim 1 wherein the means for providing a control signal including means for providing a signal corresponding to structural loading of the vehicle, comprises:
   means for providing an error signal;
   means for providing a normal acceleration signal corresponding to structural loading; and
   means connected to the error signal means and to the normal acceleration signal means for adding the signals therefrom to relate the error signal to structural loading and for providing the control signal in accordance therewith.

5. A system as described by claim 4, wherein the means for providing an error signal comprises:
   means for providing an attitude command signal;
   means for providing an attitude rate signal; and
   means connected to the command signal means and to the rate signal means for summing the signals therefrom and for providing the error signal in accordance with the summation.

6. A system as described by claim 3, including:
   means responsive to the control signal and to the limited control signal for providing a signal in accordance with the difference therebetween;
   a gate connected to said means for providing a signal when the signal from said means is greater than zero; and
   the integrator being connected to the gate and responsive to the signal therefrom so as to be reset to zero to prevent integrator memory errors.

7. A system as described by claim 3, including:
means responsive to the control signal and to the limited control signal for resetting the integrator when the control signal is greater than the limited control signal.

8. A system as described by claim 4, including:
means connected to the limiter and connected to the normal acceleration signal means for subtracting the normal acceleration signal from the limited control signal so as to cancel the normal acceleration signal added to the error signal; and
the control means being connected to the subtracting means and responsive to the signal therefrom for controlling the vehicle.

9. A system for controlling a flight vehicle, comprising:
means for providing an error signal;
means for providing a normal acceleration signal;
first summation means for adding the error signal and the normal acceleration signal;
a limiter connected to the first summation means for limiting the signal therefrom to maintain structural loading of the vehicle below a safe limit commensurate with the design load factor of the vehicle; means connected to the limiter for controlling the limiter as a function of instantaneous structural temperature;
second summation means connected to the limiter and connected to the normal acceleration means for subtracting the normal acceleration signal from the limited signal; and
control means connected to the second summation means and responsive to the signal therefrom for controlling the vehicle.

References Cited

UNITED STATES PATENTS

| | | | |
|---|---|---|---|
| 2,751,542 | 6/1956 | Woodward | 318—489 |
| 2,866,933 | 12/1958 | Bond et al. | 318—489 |
| 2,951,659 | 9/1960 | Yoller | 244—14 |

FERGUS S. MIDDLETON, *Primary Examiner.*

U.S. Cl. X.R.

244—77; 318—489